United States Patent [19]

Lawless

[11] 4,231,231
[45] Nov. 4, 1980

[54] CRYOGENIC CERAMIC AND APPARATUS

[75] Inventor: William N. Lawless, Westerville, Ohio

[73] Assignee: Corning Glass Works, Corning, N.Y.

[21] Appl. No.: 29,554

[22] Filed: Apr. 13, 1979

[51] Int. Cl.$^3$ .................. C04B 35/42; C09K 5/00; F25B 19/00; F28D 17/00
[52] U.S. Cl. ............................ 62/514 R; 106/39.5; 106/73.2; 106/302; 165/10; 252/70; 252/62.51; 252/63.2; 423/595; 62/6
[58] Field of Search ............................ 62/3, 6, 514 R; 423/595; 252/62.51, 62.62, 70, 63.2, 63.5; 106/39.5, 66, 292, 302, 301; 165/10

[56] References Cited
U.S. PATENT DOCUMENTS

| 3,165,419 | 1/1965 | Bayer | 106/302 |
|---|---|---|---|
| 3,438,724 | 4/1969 | Hartford et al. | 106/66 |
| 3,523,574 | 8/1970 | Haskin | 165/10 |
| 3,595,810 | 7/1971 | Kehl | 423/595 |
| 3,638,440 | 2/1972 | Lawless | 62/3 |
| 3,650,117 | 3/1972 | Robinson et al. | 62/3 |
| 3,832,205 | 8/1974 | Lowery | 106/288 B |
| 4,075,029 | 2/1978 | Nuss | 106/292 |
| 4,082,138 | 4/1978 | Miedema et al. | 62/6 X |

FOREIGN PATENT DOCUMENTS 1282307 7/1972 United Kingdom.

OTHER PUBLICATIONS

Ceramic Industry-Mar. 1960 "New Ceramic Materials" pp. 74-75.

Primary Examiner—Helen M. McCarthy
Attorney, Agent, or Firm—Richard N. Wardell

[57] ABSTRACT

Ceramic material, and cryogenic refrigeration apparatus containing thermal energy absorbing elements made of the ceramic material, which is a dielectric insulator and has values of specific heat at selected temperatures below 15° K. that are greater than or at least equal to the values of specific heat of pure lead at those same temperatures. Material consists essentially of a crystalline phase with a composition defined by the molar formula selected from: (1) $AB_2O_4$ where A is Group 2b metal ions with or without other divalent metal ions and B is Cr ion with or without other trivalent metal ions, (2) $AB_2O_6$ where A is Mn and/or Ni ion(s) with or without other divalent metal ions and B is Nb and/or Ta ion(s), and (3) $A_2BCO_6$ where A is Pb ion with or without other divalent metal ions, B is Gd or Mn with or without other trivalent metal ions and C is Nb and/or Ta ion(s). Elements include regenerator packings, thermal dampers and dielectric insulation.

22 Claims, 7 Drawing Figures

CRYOGENIC CERAMIC AND APPARATUS

BACKGROUND OF THE INVENTION

Considerable growth in the knowledge and technology of cryogenics has occurred during the past three decades. For example, see Haselden, Cryogenic Fundamentals, published 1971 by Academic Press, London; Bailey, Advanced Cryogenics, published 1971 by Plenum Press, London; Barron, Cryogenic Systems, published 1966 by McGraw-Hill, Inc., New York; Cryogenic Engineering (Proceedings of the First Cryogenic Engineering Conference in Japan on Apr. 9-13, 1967), published 1968 by Heywood Temple Industrial Publications Ltd., London; and U.S. Air Force Technical Report AFFDL-TR-73-149 Volume 1, December 1973 (Proceedings of the Cryogenic Cooler Conference at USAF Academy, Colorado, on October 16-17, 1973). Nevertheless, the capability and efficiency with which a variety of cryogenic equipment can operate to produce and maintain service temperature below about 15° K. (and as low as about 2° K. or less) has still been limited and hampered by the availability of materials that have adequate combinations of thermal and/or dielectric and/or mechanical properties and are economical to manufacture in the required form of apparatus elements and components.

Heat exchange means in a cryogenic refrigeration system with fluid refrigerant is one of the most important elements in determining the capability and efficiency of the system (see Cryogenic Engineering, supra, p. 222). In such a system utilizing a regenerator as the heat exchange means, the capability and efficiency are importantly governed by the thermal properties of the regenerator packing material (see Bailey, supra, p. 200-1, and Barron, supra, p. 321). One such thermal property that is very important and intrinsic to the packing material is the volumetric heat capacity (or specific heat) of that material at intended service temperature. Heretofore, Pb shot or other shaped bodies of lead or leadantimony alloys (or even copper) have commonly been employed as the packing material giving the then best combination of specific heat and economical manufacture for systems operating as low as about 15° K. or lower. Nevertheless, these common packing materials present difficulties in maintaining significant thermal loads at temperatures in the range of about 6°-15° K. with good efficiency and without complex multicycle systems or equipment. Of course, there have been suggestions to fabricate regenerator structure of other less economical materials with specific heats higher than that of lead at such very low temperatures, viz. materials with "excess" specific heat (added to their basic Debye contribution) due to phenomena like phase, magnetic and order-disorder transformations within the materials at low temperature, such as neodymium with the additional specific heat contribution of its magnetic transformation (see Haselden, supra., p. 314), or, as more simply and customarily stated, with specific heat anomalies (see Bailey, supra, p. 201).

I perceive that such materials with the higher specific heat at very low temperatures can also be used advantageously to fabricate other thermal energy absorbing elements in cryogenic refrigeration systems (including those with solid refrigerants such as paraelectric refrigerants—see U.S. Pat. No. 3,638,440) so as to enhance the capability and efficiency of those other elements and of the systems as a whole. Among such other elements are those which serve as thermal dampers and thermal isolators. If such materials were additionally characterized by being dielectrics, they could advantageously serve also as dielectric insulation and dielectric isolators of superconducting components operative at the very low temperatures.

SUMMARY OF THE INVENTION

I have now discovered a family of new ceramic materials which are characterized by being dielectric insulators and having values of specific heat at selected temperatures below 15° K. that are greater than or at least equal to the values of specific heat of pure Pb at those same temperatures. I have found that these new ceramic materials can be fairly easily and economically fabricated into shaped bodies of various forms that can serve as novel thermal energy absorbing elements functioning at temperatures below 15° K. in association with the refrigerant within cryogenic refrigeration apparatus.

My new ceramic materials consist essentially of a crystalline phase with a composition defined by the molar formula selected from:

(1) $AB_2O_4$ where
   A is selected from one or more of Group 2b metal ions alone or in combination with one or more of other divalent metal ions where at least about 90 mole % of A is Group 2b metal ion or ions, and
   B is either Cr ion or Cr ion plus one or more of other trivalent metal ions where at least about 90 mole % of B is Cr ion;

(2) $AB_2O_6$ where
   A is selected from one or both of Mn and Ni ions alone or in combination with one or more of other divalent metal ions where at least about 90 mole % of A is ion or ions of Mn and Ni, and
   B is selected from one or both of Nb and Ta ions; and (3) $A_2BCO_6$ where
   A is selected from Pb ion alone or in combination with one or more of other divalent metal ions where at least about 90 mole % of A is Pb ion,
   B is either Gd ion or Mn ion alone or in combination with one or more of other trivalent metal ions where at least about 90 mole % of B is Gd ion or Mn ion, and
   C is selected from one or both of Nb and Ta ions.

In the materials consisting essentially of the $AB_2O_4$ spinel phase, the Group 2b metal ions (of the Periodic Table of Elements) are preferably those of Zn and/or Cd, exemplary other divalent metal ions as dopants are those of Ba, Sr and Pb, and exemplary other trivalent metal ions as dopants are those of Fe, other transition metals (of the Periodic Table) and the rare earth metals (including yttrium).

In the materials consisting essentially of the $AB_2O_6$ phase, exemplary other divalent metal ions as dopants are those of Fe, Zn, Cd, Ba and Sr.

In the materials consisting essentially of the $A_2BCO_6$ phase, exemplary other divalent metal ions as dopants are those of Zn, Cd, Ba and Sr, and exemplary other trivalent metal ions as dopants are those of Cr, Fe, other transition metals and the rare earth metals (including yttrium).

DETAILED DESCRIPTION

Figure 1:
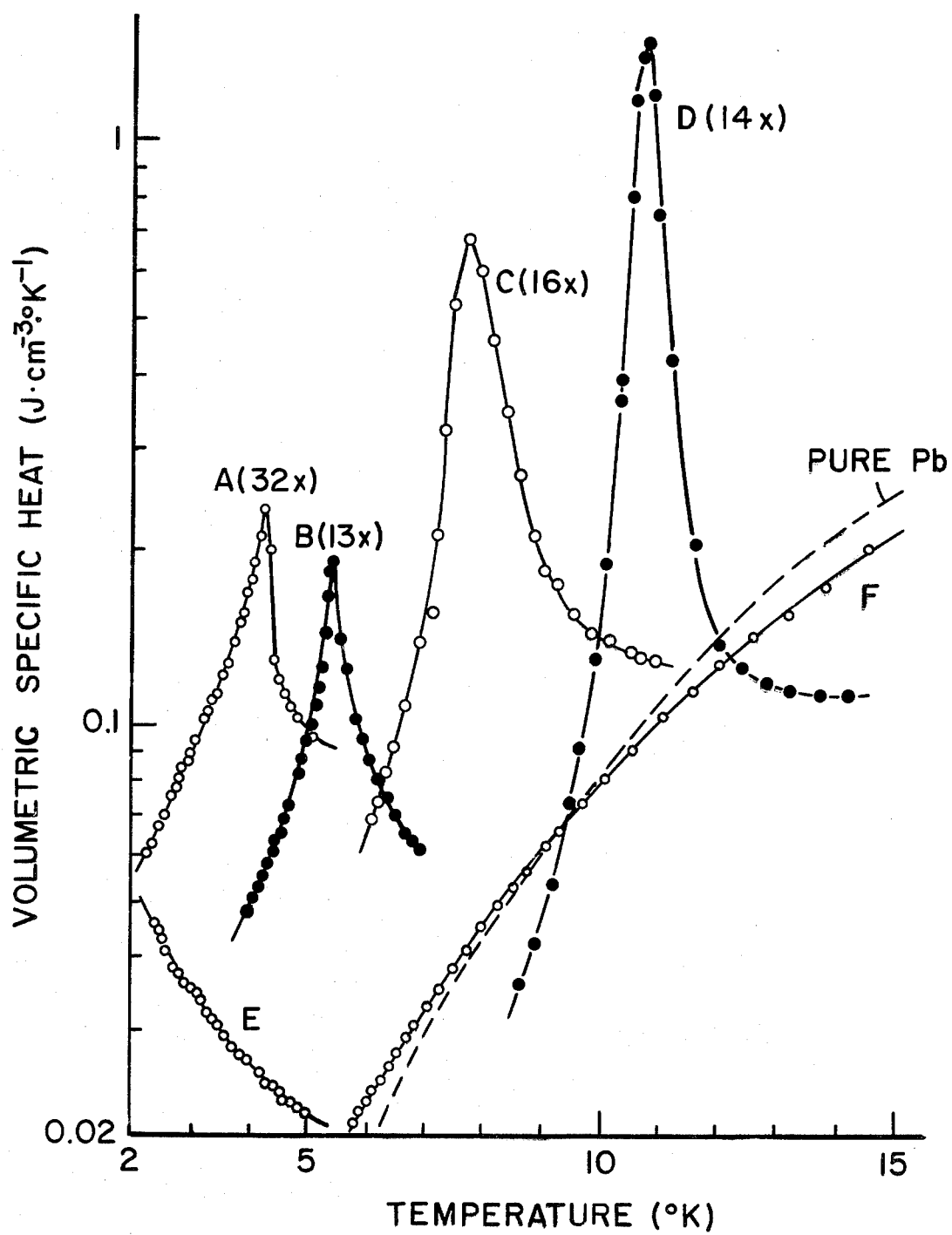
FIG. 1 is a graphical presentation of the variation in volumetric specific heat with temperature for six embodiments (A, B, C, D, E and F) of the present invention in comparison to that of pure lead.

Ceramic material of this invention can be made by any of the conventional or known methods of forming ceramic materials and shaped bodies thereof. As essential crystalline phase according to this invention may be associated or interspersed with other crystalline or glass phases within the same body of ceramic or glass-ceramic as may be desired. Any suitable batch materials can be employed that will enable the essential crystalline phase to be developed in the body resulting from any particular method of forming it.

The presently preferred manner of making bodies of the ceramic materials of this invention is to thoroughly and intimately mix very finely divided powders of high purity reagent grade oxides and/or precursors thereof, in proper molar proportions to yield the desired composition, by ball milling them together in distilled water (or other inert liquid) using zirconia ball milling media and Nalgene bottles as the milling containers. The mixed slurry is then dried, calcined, ball milled again in distilled water, dried again and passed through a −325 mesh (U.S. Standard) screen to yield a formable granular batch material. If desired to enhance green strength and/or plastic formability of the batch material, a customary fugitive organic binder-plasticizer can be incorporated into this batch material. The batch material is then pressed at room temperature in a die to form the desired shaped green body and then fired up to and at sintering temperature in air or other appropriate atmospheres on a zirconia setter plate or platinum foil plate to produce the preferred dense, coherent, dielectric ceramic body. Alternatively, in the preferred manner, the batch material can be hot pressed in a die lined with molybdenum foil (or other nonreactive lining) at the sintering temperature.

Room temperature and hot pressing pressures can beneficially vary with mass or body thickness. For thicknesses up to about one centimeter (as in the Examples below), pressure of about 5 ksi is preferred for both pressing techniques. However pressure of 1 ksi or greater can be used, especially for hot pressing.

Time at calcine and sintering temperatures can also desirably vary with mass or body thickness. For thicknesses up to about one centimeter, (as in the Examples below), calcine time of about two hours and sintering (hot pressing) time of about one hour are preferred.

Specific heat data were determined from pressed and fired pellets of about two grams with a diameter of about 9.52 mm and a thickness of about 6.35 mm.

Thermal conductivity data were determined on bars 3 cm long by 0.090 $cm^2$ cross-sectional area, which were cut from hot pressed plates of 5 cm diameter and 0.5 cm thickness.

EXAMPLE 1

Materials A and B were prepared by the preferred procedures set forth above, except that Material A was fired on platinum foil instead of zirconia, as was the case with Material B. Material A was made from 37.260 wt. % $Mn_2O_3$ and 62.742 wt. % $Nb_2O_5$ by calcining at 965° C. and sintering at 1250° C. to yield bodies with the single phase molar composition $MnNb_2O_6$ and true density of 5.16 g/cc. Material B was made from 78.066 wt. % $Nb_2O_5$ and 21.936 wt. % NiO by calcining at 1010° C. and sintering at 1350° C. to yield bodies with the single phase molar composition $NiNb_2O_6$ and true density of 5.50 g/cc.

The volumetric specific heats of dielectric Materials A and B between about 2°–7° K. are shown in FIG. 1 to have respective specific heat anomalies with peak values at 4.25° K. and 5.48° K. which are respectively thirty-two times greater (32×) and thirteen times greater (13×) than the volumetric specific heat of pure lead at these same temperatures.

Figure 3:
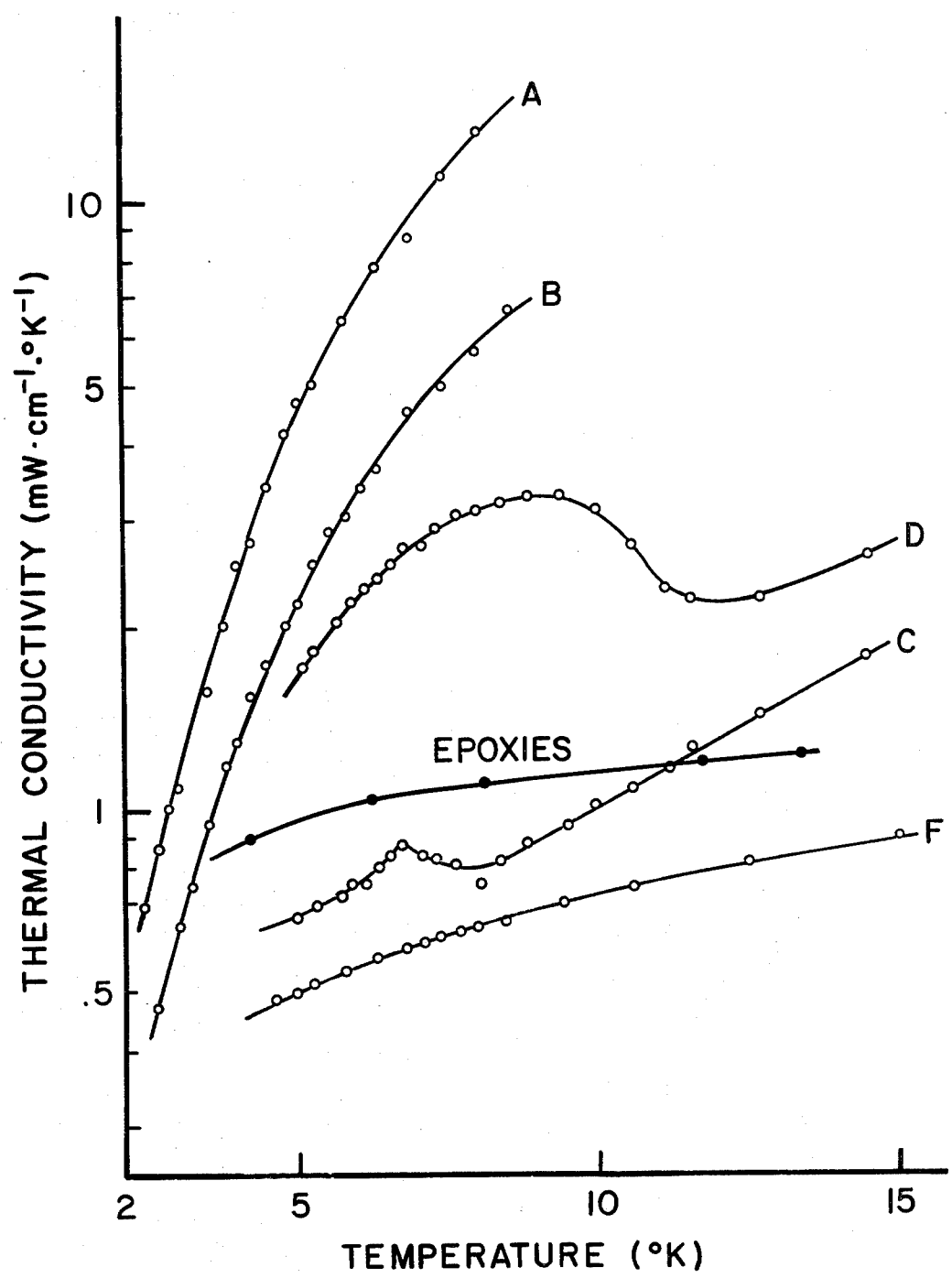
FIG. 3 is a graphical presentation of the variation in thermal conductivity with temperature for five embodiments (A, B, C, D and F) of the present invention and for an average of three typical epoxy resin materials.

The thermal conductivities of Materials A and B between about 2°–9° K. are shown in FIG. 3.

Comparable properties can be attained in ceramic materials having Ta substituted for Nb in the preceding compositions. Also, such materials can be made with combinations of Mn and Ni, e.g. in solid solutions thereof.

Similarly, materials with comparable properties can be obtained by doping the preceding compositions with other divalent metal ions. Examples are: $(Mn_{0.9}Fe_{0.1})(Nb_{0.5}Ta_{0.5})_2O_6$ and $(Ni_{0.95}Cd_{0.05})Ta_2O_6$.

EXAMPLE 2

In attempting to prepare samples composed solely of the $AB_2O_4$ spinel compositions (e.g. $CdCr_2O_4$) by reacting constituent oxide batch ingredients, it was found not to be possible by sintering at temperatures up to 1500° C., even in their own atmosphere. The term "their own atmosphere" means: the pellets pressed at room temperature are each placed in a sealed tight-fitting enclosure (e.g. of platinum or glass) at room temperature; and then on heating to the sintering temperature, the gases evolved from the pellets (e.g. volatile vapors of material in the pellet) are confined to the interior of their respective enclosures, thereby creating their own atmosphere during firing.

Therefore, the preferred manner of forming these spinel compositions included the addition of mineralizer material to the batch material, which mineralizer material forms a second or mineralizer phase in the ceramic product that is at least innocuous to the primary specific heat property of the invention. As is known in ceramic technology, a mineralizer performs the function of enabling a sintering reaction to occur more readily than is otherwise possible. One suitable form of mineralizer of the spinel-forming reaction in this case is of the columbite (niobite) type, e.g. batch ingredients forming a molar composition $AC_2O_6$ where A is the same as in the $AB_2O_4$ spinel phase and C is selected from Nb ion, Ta ion and mixtures thereof. Although the batch material may contain excess AO oxide constituent (beyond that for the $AB_2O_4$ spinel and $AC_2O_6$ columbite), it is usually lost due to volatilization during firing.

Accordingly, dielectric Materials C and D were prepared by the preferred procedures set forth above, including a columbite type mineralizer addition and firing in their own atmospheres (as previously described) instead of merely air. Material C was made from 21.516 wt. % $Nb_2O_5$, 41.574 wt. % CdO and 36.912 wt. % $Cr_2O_3$ by calcining at 1050° C. and sintering at 1350° C. to yield bodies with true density of 5.91 g/cc. and two interspersed crystalline phases in molar proportions as follows: $3CdCr_2O_4$ plus $CdNb_2O_6$ (which can be abbreviated for convenience to $Cd_2Cr_3NbO_9$). Material D was made from 25.380 wt. % $Nb_2O_5$, 43.542 wt. % $Cr_2O_3$ and 31.080 wt. % ZnO by calcining at 1000° C. and sintering at 1350° C. to yield bodies with true density of 5.25 g/cc. and two interspersed crystalline phases in molar proportions as follows: $3ZnCr_2O_4$ plus $ZnNb_2O_6$ (which can be abbreviated for convenience to $Zn_2Cr_3NbO_9$).

The volumetric specific heats of Materials C and D between about 6°–14° K. are shown in FIG. 1 to have respective specific heat anomalies with peak values at 7.75° K. and 10.8° K., which are respectively sixteen times greater (16×) and fourteen times greater (14×) than the volumetric specific heat of pure lead at those same temperatures.

Figure 2:
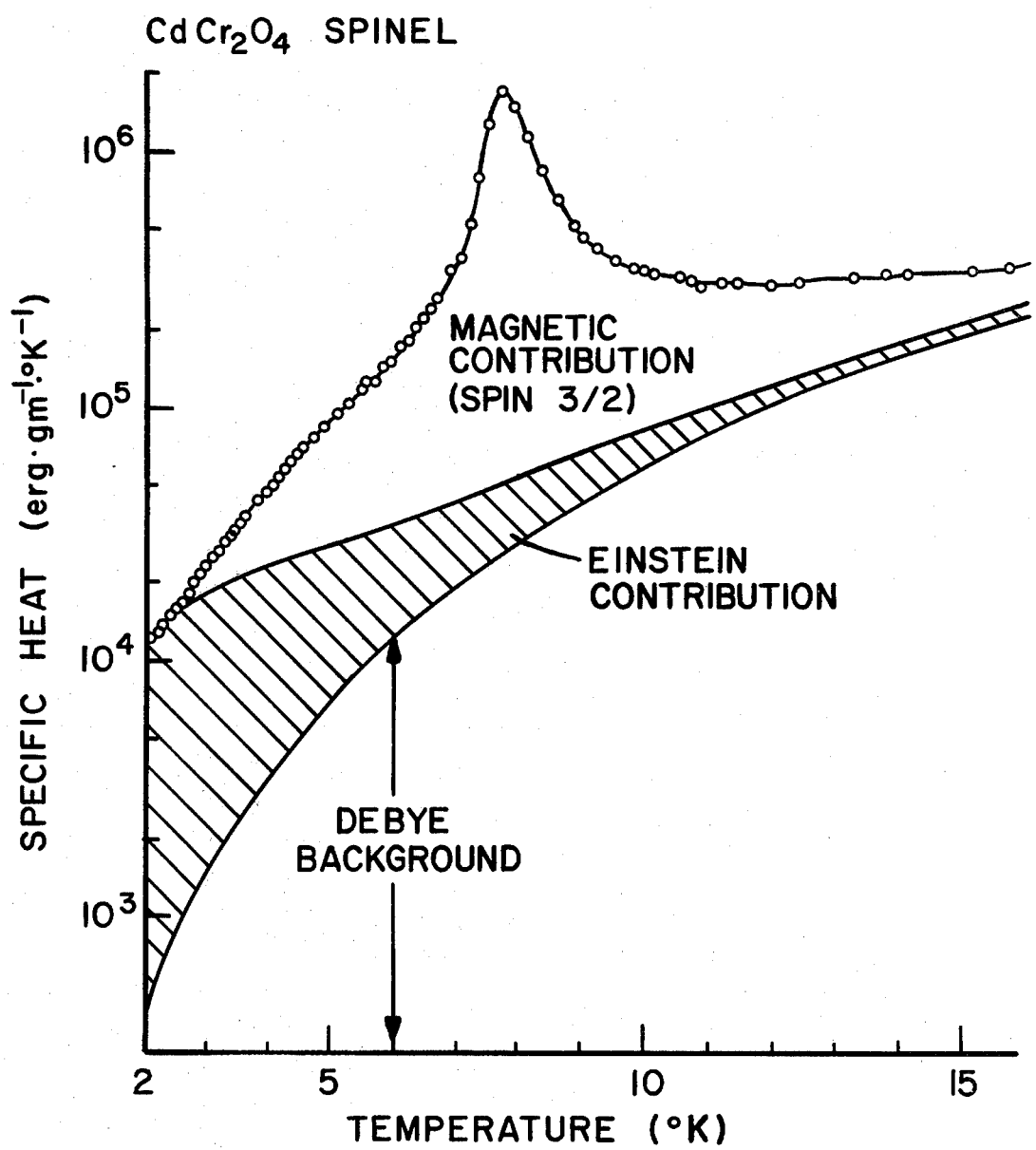
FIG. 2 is a graphical presentation of the variation in specific heat (on a weight basis) with temperature for the $CdCr_2O_4$ spinel embodiment of the present invention within Material C with respect to the three contributions or terms of specific heat constituting the total specific heat thereof.

As illustrative of the basis for the specific heat anomalies shown in FIG. 1, the specific heat data shown in FIG. 2 was determined by, first, preparing sintered pure $CdNb_2O_6$ single phase columbite and measuring its specific heat at a series of selected temperatures over the range of 2°–16° K., and, second, subtracting the specific heats of single phase $CdNb_2O_6$ from those determined for Material C at the same series of selected temperatures, care being taken to account for the percentage of the columbite phase in the mixture of Material C. The resulting differences are plotted as the upper curve linking open circles in FIG. 2. As the single phase $CdNb_2O_6$ had very small specific heat values vis a vis those of Material C, that upper curve for the $CdCr_2O_4$ spinel alone approximates the actual total specific heats of Material C. From specific heat values of the upper curve in FIG. 2, the basic or background Debye contributions and the additional low-frequency Einstein contributions to the total specific heats over the series of selected temperatures were determined. Such additional or "excess" specific heat contributions of a Einstein low-lying vibrational mode have been noted heretofore for other materials (see Lawless, Physical Review, B14(1), July 1, 1976, p. 134). Above the combined Debye and Einstein contributions in FIG. 2 is an area of "excess" specific heat contributions that have been determined to result from a magnetic ordering or spin transition. It is believed that similar factors contribute to the specific heat anomalies (i.e. peaked curves) for Materials A, B and D.

The thermal conductivities of Materials C and D between about 5°–15° K. are shown in FIG. 3.

EXAMPLE 3

The various $AB_2O_4$-containing materials of this invention prepared for reagent grade constituent oxides may contain more or less of the mineralizer phase set forth in Example 2. Extra mineralizer phase does not appear to provide any extra advantage in the case of forming the ceramic material with $CdCr_2O_4$ and $ZnCr_2O_4$ spinels. However, two-phase ceramic materials were formed with the approximate molar compositions and proportions of $CdCr_2O_4$ plus $CdNb_2O_6$ (or abbreviated $CdCrNbO_5$) and of $ZnCr_2O_4$ plus $ZnNb_2O_6$ (or abbreviated $ZnCrNbO_5$), which materials had thermal properties similar to those of Example 2.

$AB_2O_4$-containing materials can be made with properties according to this invention by formulating them with various combinations of Zn and Cd as the A constituent in the molar compositions. Also, Hg can be substituted for all or part of the Zn and/or Cd in these spinel-containing compositions, although such resulting materials are not as preferred as those with Zn and/or Cd.

EXAMPLE 4

The materials containing $AB_2O_4$ spinel can be made with properties according to this invention by doping with other trivalent metals in partial replacement of chromium. Preferably iron is substituted for a minor portion of Cr. An example of such material is $Cd(Cr_{0.95}Fe_{0.05})_2O_4$ plus $CdNb_2O_6$ (or abbreviated $CdCr_{0.95}Fe_{0.05}NBO_5$).

Similary, $AB_2O_4$-containing materials with properties according to this invention can be made by doping with other divalent metals in partial replacement of Group 2b metals. Examples are:

$(Cd_{0.9}Ba_{0.1})Cr_2O_4$ plus $(Cd_{0.9}Ba_{0.1})Nb_2O_6$ (or abbreviated $Cd_{0.9}Ba_{0.1}CrNbO_5$) and $(Zn_{0.95}Pb_{0.05})(Cr_{0.9}Gd_{0.12}O_4$ plus $(Zn_{0.95}Pb_{0.05})Ta_2O_6$ (or abbreviated $Zn_{0.95}Pb_{0.05}Cr_{0.9}Gd_{0.1}TaO_5$).

Example 5

Materials E and F were prepared by the preferred procedures set forth above. Material E was made from 15.670 wt. % $Nb_2O_5$, 63.006 wt. % $PbCO_3$ and 21.326 wt. % $Gd_2O_3$ by calcining at 825° C. and sintering at 850° C. to yield bodies with the single phase molar spinel composition $Pb_2GdNbO_6$ and true density of 8.02 g/cc. Material F was made from 9.462 wt. % $Mn_2O_3$, 64.062 wt. % $PbCO_3$ and 26.476 wt. % $Ta_2O_5$ by calcining at 850° C. and sintering at 1000° C. to yield bodies with the single phase molar perovskite composition $Pb_2MnTa_6O$ and true density of 9.11–9.68 g/cc.

FIG. 1 shows the volumetric specific heats of dielectric Materials E and F. The specific heat values for Material E as given between about 2°–5° K. (which are much greater than those of pure Pb at such temperatures) and it is expected that a peak volumetric specific heat is attained below 2° K. with a basis for such specific heat anomaly being similar to that of Materials A-D. Material F is shown to have specific heat values between about 6°–15° K. that do not reflect any specific heat peak anomaly existing in this material at such temperatures, altough it has been determined that its specific heat at these temperatures does include an Einstein contribution in addition to the Debye background value thereof. However, Material F does have specific heat greater than or equal to that of pure lead at temperatures below about 9.5° K.

The quite low thermal conductivity of Material F between about 4.5°–15° K. is shown in FIG. 3.

Illustrative dielectric properties of Material F at 4.2° K. are as follows:

| Frequency kHz | Dielectric Constant | Loss Tangent |
| --- | --- | --- |
| 0.2 | 354.5 | 0.00716 |
| 0.5 | 352.8 | 0.00721 |
| 1 | 351.7 | 0.00729 |
| 2 | 350.6 | 0.00733 |
| 5 | 349.1 | 0.00743 |
| 10 | 348.0 | 0.00760 |

The preceding $Pb_2ABO_6$ type of materials can be made with either Nb or Ta substituted in whole or in part for each other.

$A_2BCO_6$-contaning materials with properties according to this invention can also be made by doping with other divalent metals in partial substitution for Pb and/or with other trivalent metals in partial substitution for Gd or Mn. Examples are: $(Pb_{0.9}Zn_{0.1})_2GdTaO_6$ and $(Pb_{0.95}Ba_{0.05})_2(Mn_{0.95}Cr_{0.05})NbO_6$.

EXAMPLE 6

Figure 4:
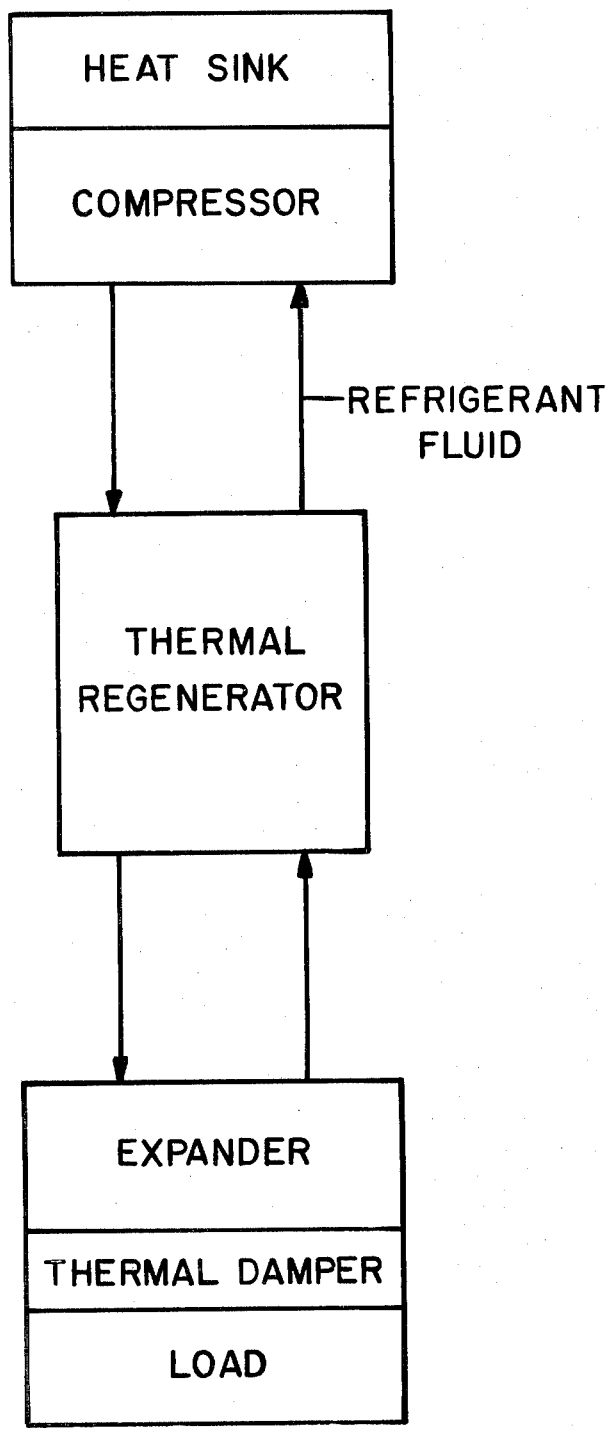
FIG. 4 is a simplified schematic representation of state-of-the-art cryogenic refrigeration apparatus which can be made to embody the present invention.

The materials of this invention can be used to form novel regenerator packing or matrix of a closed-cycle cryogenic refrigeration system. Such a system is schematically illustrated in FIG. 4. When the refrigerant fluid undergoes compression in the compressor, heat energy is generated and dissipated to the adjoining heat sink (which may be either the ambient atmosphere or the thermal load of a preceding cycle portion of the refrigeration system). That compressed fluid refrigerant is then passed through the regenerator, wherein the refrigerant is cooled by giving up much of its heat content to the regenerator packing or matrix. The cooled compressed fluid refrigerant is then caused to expand while doing some form of work in the expander, whereby such refrigerant is chilled further. As a consequence, it chills the thermal load and keeps it at a desired service temperature while taking up heat energy generated by or occurring in the load. Then the chilled expanded gas is passed back through the regenerator, thereby again cooling the packing or matrix by taking up the heat energy stored in it from the previous passage of compressed refrigerant. This refrigerant cycle is repeated continuously during operation of the refrigerator.

Materials A-D are especially suitable for replacing lead as regenerator packing in refrigerators desired to be operated with service (load) temperatures below 15° K. In the case of refrigerators operating below 9.5° K., Material F can replace lead as the regenerator packing. In fact, where the entire regenerator is desired to be made entirely of dielectric material, the materials of this invention can be used for the complete regenerator construction.

The ceramic materials of this invention are readily shaped in the form of balls or pellets similar to lead shot packing. Moreover, they can be given a great variety of shapes as packing pellets (similar to catalyst support packing). Also, these ceramic materials can be pressed, cast, extruded or otherwise shaped into any other suitable forms of packing, such as porous or honeycombed monolithic bodies. The may even be formed as replicas of organic foam materials by soaking up a slurry of the ceramic batch materials into a flexible organic foam and then burning out the organic foam during firing of the contained ceramic material.

EXAMPLE 7

In cases where it is desirable to maintain a refrigerated load at a very steady service temperature (e.g. such as with some electronic circuits operating at 4.2° K., or some infra-red detectors operating below 2° K.), it can be advantageous to interpose a thermal damper (or heat sink) between the load and the expander as shown in FIG. 4 so that the thermal damper acts to attenuate the small temperature variations in the expander between each expansion phase of the refrigerant cycle away from the load, thereby minimizing temperature fluctuations at the load. Such thermal damper can be beneficially made of ceramic material of this invention. A thermal damper to operate at about 4.2° K. can be made of Material A in a suitably shaped mass connected to the load and the expander (or chilled refrigerant conduit) whereas a thermal damper to operate at temperatures below 2° K. can be made of Material E in a suitable configuration for such function.

EXAMPLE 8

Figure 5:
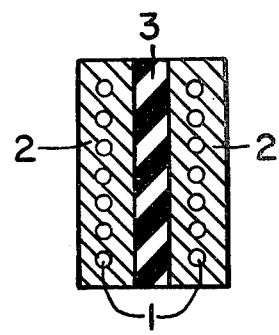
FIG. 5 is an abbreviated cross-sectional representation of state-of-the-art superconducting windings for magnets, motors or generators under cryogenic refrigeration and which can be made to embody the present invention.

Another form of cryogenic refrigeration load comprises superconducting windings as illustrated in FIG. 5. They comprise superconducting wires or cables 1 (e.g. made of niobium alloys) jacketed or embedded in normal metallic conductors 2 (e.g. made of copper) which are held in spaced relation to each other (and to any other electrically conductive part of the apparatus) by dielectric insulation 3 (which heretofore has commonly been filled or unfilled epoxy resin material). Such dielectric insulation can be formed of ceramic material of this invention with the distinct advantage of greater specific heat than that of the epoxy resin materials and, in some cases, with the further notable benefit of larger thermal conductivity than that of epoxy resins (see FIG. 3). Thus, ceramic dielectric insulation of this invention can also provide better thermal damping of temperature fluctuations impacting on and of localized heating in the superconducting wires or cables (with possibly less copper jacketing required for stabilization). Material A would be especially useful for superconducting magnets operating at about 4° K. and Material B would serve well in motors or generators with superconducting windings operating at about 5°–6°.

EXAMPLE 9

Figure 6:
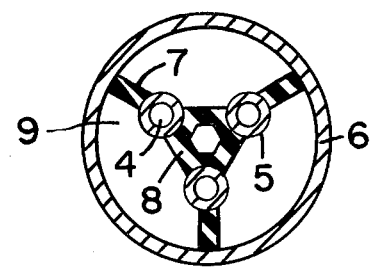
FIG. 6 is an abbreviated cross-sectional representation of the state-of-the-art superconducting electric power transmission line operative under cryogenic refrigeration and which can be made to embody the present invention.

FIG. 6 illustrates a further form of load in a cryogenic refrigeration system, which is a superconducting transmission line comprising superconducting wires or cables 4 jacketed or embedded in normal metallic conductors 5 contained within a refrigerant casing 6. The composite of wires/conductors 4–5 are held in spaced relation to the casing 6 (usually at spaced points along the lengths of the composite 4–5 and casing 6) by dielectric standoffs or insulation members 7 and by dielectric spacers or insulating separators 8. Chilled fluid refrigerant passes through longitudinal passage 9. The dielectric insulation components 7 and 8 can be advantageously made of ceramic material of this invention instead of epoxy resin or other known dielectric materials for reasons similar to those noted in Example 8. However, Material F would be especially suitable in the form of insulation members 7 and 8 because of its combined properties of: (a) high specific heat and low thermal conductivity vis a vis typical epoxy resins, (b) large dielectric constant, and (c) thermal expansion characteristics well matched to niobium metal and its alloys. Thus, standoffs of Material F would distinctly serve as thermal and dielectric isolators of the composite cable 4–5 from the casing 6.

EXAMPLE 10

Figure 7:
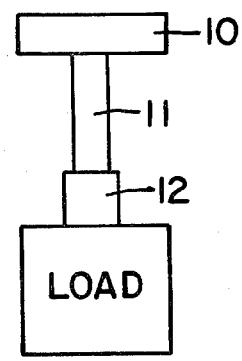
FIG. 7 is a simplified schematic representation of a state-of-the-art assembly of solid refrigerant connected by means of a superconductive thermal valve to a load to be refrigerated and which has been made to embody the present invention.

Ceramic materials of the present invention can also serve as components in systems with solid cryogenic refrigerants as illustrated in FIG. 7. As is disclosed in U.S. Pat. No. 3,638,440, the solid refrigerant 10 can be illustratively of type I or paraelectric material that cools upon adiabatic depolarization thereof and the superconductive thermal valve 11 can be of the type disclosed in the noted patent. The valve 11 can be connected to the load by means of a thermal damper/isolator 12 made of ceramic material according to this invention. This ceramic element 12 would enable maintenance of the load at very low and very even temperature, such as below 2° K. when element 12 is formed of Material E.

I claim:
1. Ceramic material:
   (a) characterized by
      (1) being a dielectric insulator and
      (2) having values of specific heat at selected temperatures below 15° K. that are greater than or at least equal to the values of specific heat of pure Pb at those same temperatures, and
   (b) consisting essentially of a crystalline phase with a composition defined by the molar formula $AB_2O_4$ wherein
      A is one or more of Group 2b metal ions plus other divalent metal ion or ions where at least about 90 mole % of A is Group 2b metal ion or ions, and
      B is either Cr ion or Cr ion plus one or more of other trivalent metal ions where at least about 90 mole % of B is Cr ion.
2. Ceramic material:
   (a) Characterized by
      (1) being a dielectric insulator and
      (2) having values of specific heat at selected temperatures below 15° K. that are greater than or at least equal to the values of specific heat of pure Pb at those same temperatures, and
   (b) consisting essentially of a crystalline phase with a composition defined by the molar formula $AB_2O_4$ wherein
      A is Cd ion alone or in combination with one or more of other divalent metal ions where at least about 90 mole % of A is Cd ion, and
      B is Cr ion plus other trivalent metal ion or ions where at least about 90 mole % of B is Cr ion.
3. Material of claim 2 wherein the other trivalent metal ion is Fe.
4. Material of claim 3 wherein A is Cd ion.
5. Ceramic material:
   (a) characterized by
      (1) being a dielectric insulator and
      (2) having values of specific heat at selected temperatures below 15° K. that are greater than or at least equal to the values of specific heat of pure Pb at those same temperatures, and
   (b) consisting essentially of
      (1) a crystalline phase with a composition defined by the molar formula $AB_2O_4$ where
         A is selected from one or more of Group 2b metal ions alone or in combination with one or more of other divalent metal ions where at least about 90 mole % of A is Group 2b metal ion or ions, and
         B is either Cr ion or Cr ion plus one or more of other trivalent metal ions where at least about 90 mole % of B is Cr ion, and
      (2) a mineralizer crystalline phase that is of the niobite type.
6. Material of claim 5 wherein the niobite type phase has a composition defined by the molar formula $AC_2O_6$ where A is the same as in the $AB_2O_4$ spinel phase and C is selected from one or both of Nb and Ta ions.
7. Material of claim 6 wherein C is Nb ion.
8. In cryogenic refrigeration apparatus comprising a load to be refrigerated,
   a refrigerant adapted to refrigerate the load at temperatures below 15° K.,
   thermal energy absorbing elements associated with the refrigerant and adapted to function at temperatures below 15° K.,
   wherein the improvement comprises at least one of the thermal energy absorbing elements being composed of ceramic material:
      (a) characterized by
         (1) being a dielectric insulator and
         (2) having values of specific heat at selected temperatures below 15° K. that are greater than or at least equal to the values of specific heat of pure Pb at those sampe temperatures, and p2 (b) consisting essentially of a crystalline phase with a composition defined by the molar formula $AB_2O_4$ where
         A is selected from one or more of Group 2b metal ions alone or in combination with one or more of other divalent metal ions where at least about 90 mole % of A is Group 2b metal ion or ions, and
         B is either Cr ion or Cr ion plus one or more of other trivalent metal ions where at least about 90 mole % of B is Cr ion.
9. The apparatus of claim 8 wherein
   the refrigerant is fluid refrigerant, and
   the at least one of the elements is regenerator packing adapted to alternately take up thermal energy from and give up thermal energy to the refrigerant.
10. The apparatus of claim 8 wherein said at least one of the elements is a thermal damper connected to the load and interposed between the load and the refrigerant.
11. The apparatus of claim 8 wherein
    the load includes at least one superconducting component and
    the at least one of the elements is dielectric insulation associated with the at least one component to electrically insulate the component from other conductive parts of the apparatus.
12. Apparatus of claim 8 wherein B is Cr ion.
13. Apparatus of claim 12 wherein A is Zn ion.
14. Apparatus of claim 12 wherein A is Cd ion.
15. Apparatus of claim 8 wherein B is Cr ion plus other trivalent metal ion or ions.
16. Apparatus of claim 15 wherein the other trivalent metal ion is Fe.
17. Apparatus of claim 16 wherein A is Cd ion.
18. Apparatus of claim 8 wherein A is one or more of Group 2b metal ions plus other divalent metal ion or ions.

19. Apparatus of claims 8, 12, 13, 14, 15, 16, 17 or 18 wherein the ceramic material includes a mineralizer crystalline phase.

20. Apparatus of claim 19 wherein the mineralizer crystalline phase is of the noibite type.

21. Apparatus of claim 20 wherein the niobite type phase has a composition defined by the molar formula $AC_2O_6$ where A is the same as in the $AB_2O_4$ spinel phase and C is selected from one or both of Nb and Ta ions.

22. Apparatus of claim 21 wherein C is Nb ion.

UNITED STATES PATENT AND TRADEMARK OFFICE
CERTIFICATE OF CORRECTION

PATENT NO. : 4,231,231
DATED : November 4, 1980
INVENTOR(S) : William N. Lawless It is certified that error appears in the above-identified patent and that said Letters Patent are hereby corrected as shown below:

Column 1, line 21, change "temperature" to -- temperatures --.

Column 1, line 50, change "structure" to -- structures --.

Column 3, line 35, change "As" to -- An --.

Column 5, line 4, change "of" to -- for --.

Column 6, line 6, change "for" to -- from --.

Column 6, line 40, change "$(Cr_{0.9}Gd_{0.12}O_4$" to -- $(Cr_{0.9}Gd_{0.1})_2O_4$ --.

Column 6, line 53, change "single phase" to -- singlephase --.

Column 6, line 65, change "altough" to -- although --.

Column 7, line 20, change "$A_2BCO_6$-contaning" to -- $A_2BCO_6$-containing --.

Column 7, line 68, change "The to -- They --.

UNITED STATES PATENT AND TRADEMARK OFFICE
CERTIFICATE OF CORRECTION

PATENT NO. : 4,231,231
DATED : November 4, 1980
INVENTOR(S) : William N. Lawless It is certified that error appears in the above-identified patent and that said Letters Patent are hereby corrected as shown below:

Column 10, claim 8, line 32, omit "p2" from line.

Column 11, claim 20, line 5, change "nolbite" to -- niobite --.

Signed and Sealed this

Seventh Day of April 1981

[SEAL]

Attest:

RENE D. TEGTMEYER

Attesting Officer    Acting Commissioner of Patents and Trademarks